United States Patent [19]

Espevik et al.

[11] Patent Number: 4,866,817
[45] Date of Patent: Sep. 19, 1989

[54] BUCKLE FASTENER AND METHOD OF APPLICATION

[75] Inventors: Craig S. Espevik, Chicago; Richard A. Openchowski, Woodridge; James H. Caputo, South Holland; Casimir M. Guzay, Hoffman Estates, all of Ill.

[73] Assignee: Panduit Corp., Tinley Park, Ill.

[21] Appl. No.: 591,156

[22] Filed: Mar. 16, 1984

[51] Int. Cl.⁴ .............................................. B65D 63/06
[52] U.S. Cl. ...................................... 24/23 W; 24/22; 24/20 R
[58] Field of Search ................... 24/19, 20 R, 20 CW, 24/20 EE, 20 TT, 20 W, 21, 23 R, 23 B, 23 W, 23 EE, 30.5 W, 456, 22, 25; 285/254

[56] References Cited

U.S. PATENT DOCUMENTS

| | | | |
|---|---|---|---|
| 194,975 | 9/1877 | Randolph | 24/115 A |
| 204,183 | 5/1878 | Arnold | 24/22 |
| 379,878 | 3/1888 | Ryan | 24/21 |
| 653,337 | 7/1900 | Campbell | 24/21 |
| 1,517,515 | 12/1924 | McGary | 24/23 W |
| 1,855,007 | 4/1932 | Bradley | 24/23 |
| 2,192,979 | 3/1940 | McAneny, Jr. | 24/23 |
| 2,199,744 | 5/1940 | Gerrard | 140/83 |
| 2,312,575 | 3/1943 | McKee | 24/23 W |
| 2,377,224 | 5/1945 | Gerrard | 24/23 |
| 2,622,460 | 12/1952 | Keeble | 81/9.3 |
| 2,816,337 | 12/1957 | Gerrard et al. | 24/23 B |
| 2,870,503 | 1/1959 | McAneny | 24/23 B |
| 2,882,934 | 4/1959 | Gerrard | 140/93.2 |
| 2,914,827 | 12/1959 | Crammond | 24/23 B |
| 3,754,303 | 8/1973 | Pollock | 24/23 |
| 3,964,133 | 6/1976 | Wasserlein, Jr. | 24/20 R X |
| 4,015,311 | 4/1977 | Curtis | 24/23 W X |
| 4,340,996 | 7/1982 | Starace | 24/20 R |
| 4,473,925 | 10/1984 | Jansen | 24/23 W |

FOREIGN PATENT DOCUMENTS 2119321 11/1983 United Kingdom ................ 24/23 B Primary Examiner—Laurie K. Cranmer
Attorney, Agent, or Firm—Charles R. Wentzel; Mark D. Hilliard

[57] ABSTRACT

A strap fastener buckle for fastening opposing ends of an object encircling strap includes first and second bridge portions partially defining first and second tubular portions and a deformable retainer extending from the buckle intermediate first and second bridge portions. One end of the strap is initially secured to the buckle. The free end of the strap is then secured to the buckle by passing the free end through first and second tubular portions, folding the free end over second bridge portion, severing the free end at a predetermined point short of the second bridge portion, and securing the severed end between first and second bridge portions by deforming the retainer to a position overlying the severed end of the strap.

8 Claims, 5 Drawing Sheets

BUCKLE FASTENER AND METHOD OF APPLICATION

TECHNICAL FIELD

The present invention relates to metal buckle fasteners for fastening opposing ends of a strap to form an object encircling and securing strap fastener.

BACKGROUND ART

Metal fasteners as opposed to fasteners made of other materials, such as thermoplastic, are characterized by the possession of many desirable properties such as: high tensile strength, high and low temperature resistence, abrasion resistence, corrosion resistence and radiation resistence.

For example, one application in which metal fasteners are desirable if not essential is in the construction of high temperature insulation sheaths. A high temperature insulation sheath is constructed by enclosing a high temperature steam pipe within a sheath of insulating material, such as calcium silicate, and applying fasteners along the length of the high temperature insulation sheath to fix the insulation sheath in position. The calcium silicate insulating material is fragile and must be positioned and secured in a careful manner. In view of the fragile nature of the insulation it is desirable that the installation force necessary to install a fastener be minimized, particularly in the radially inward direction.

Different types of metal fasteners have been proposed. One type utilizes a tool to crimp and lock a metal seal onto overlapping metal straps. Reference may be made to U.S. Pat. No. 2,199,744.

In another fastener, a seal is provided with a reduced thickness central section which is inwardly deformable by a punching operation to interlock with the underlying band. Reference may be made to U.S. Pat. No. 3,754,303.

In several proposed fasteners, seals are provided which have anchoring members disposed perpendicular to the length of the strapping material. The strapping material is affixed to the seals by folding each end of the strapping material around a respective anchoring member. The first end of the strapping material is folded around a first anchoring member so that its end is disposed inwardly of the strapping material, whereby the act of tensioning the strap tends to hold the first end in place. The free end of the strapping material is drawn under and around a second anchoring member, folded over, and then secured beneath two opposing lugs with the distal edge of the strapping material projecting past the lugs. It should be understood that it is undesirable for the sharp distal edge of the strapping material to project past the lugs where it poses a safety hazard.

The lugs of the above fasteners are positioned on opposing sides of the strapping material so that when deformed over the strapping material, their longitudinal axes are perpendicular to the longitudinal axis of the strapping material. In order to deform the lugs, it is necessary to apply a significant amount of inward radially directed force, which is typically applied by repeatedly striking each lug of the fastener with a hammer. In situations where the object to be fastened is not fragile, impact force must be carefully applied to each lug to obtain a correctly deformed lug and in situations where the object to be secured is fragile even carefully applied force can damage the underlying fragile material. Examples of seals having impact deformable lugs disposed laterally of the strapping material are disclosed in U.S. Pat. Nos. 1,855,007; 2,377,224; and 2,882,934.

SUMMARY OF THE INVENTION

Among the several objects of the present invention may be noted the provision of an improved fastener buckle for fastening a strap around an object to be secured; the provision of such buckle which can be simply and quickly applied with reduced risk of damaging the encircled and secured object; the provision of such buckle which as applied covers the sharp distal edge of the strap and prevents inadvertant contact with the sharp distal edge; the provision of such buckle which effects increased retention of tension initially applied to the strap; and the provision of such fastener which is simple and economical to manufacture and apply.

In general, the strap fastener buckle of the present invention includes first and second bridge portions partially defining first and second tubular portions, and a deformable retainer extending from the buckle intermediate the first and second bridge portions. A strap's first end is secured to the buckle and the strap's free end is adapted to encircle an object and pass consecutively through the first and second tubular portions. The free end of the strap is fastened to the buckle by bending the free end over the second bridge portion, deforming the free end between said first and second bridge portions and into position adjacent the retainer, and deforming the retainer into a position overlying the free end of the strap to retard movement of the free end from between the first and second bridge portions to fasten the free end to the buckle.

DESCRIPTION OF THE PREFERRED EMBODIMENT

Figure 1:
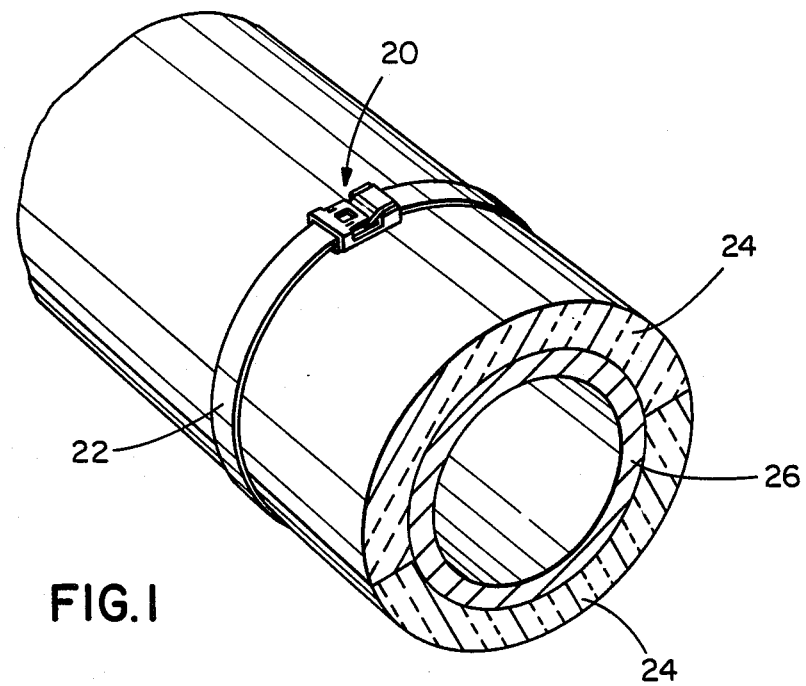
FIG. 1 is a perspective view of a buckle embodying the concept of the present invention, as seen securing a strap around an insulation sheath.

A buckle fastener embodying the concept of the present invention is designated generally by the numeral 20 in the accompanying drawings. As seen in FIG. 1, a terminated buckle 20 effects a connection between opposing ends of a metal strap 22 to form an encircling fastener that in one application can function to secure a split calcium silicate insulation sleeve 24 around a high temperature steam pipe 26.

Figure 2:
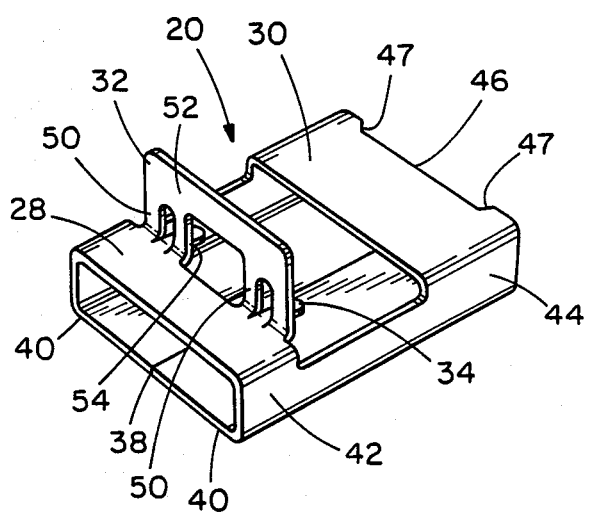
FIG. 2 is a perspective view of the buckle of FIG. 1.

As best seen in FIG. 2, buckle 20 includes a first bridge portion 28, a second bridge portion 30, a C-shaped retainer 32 and two strap guidance tabs 34.

Figure 3:
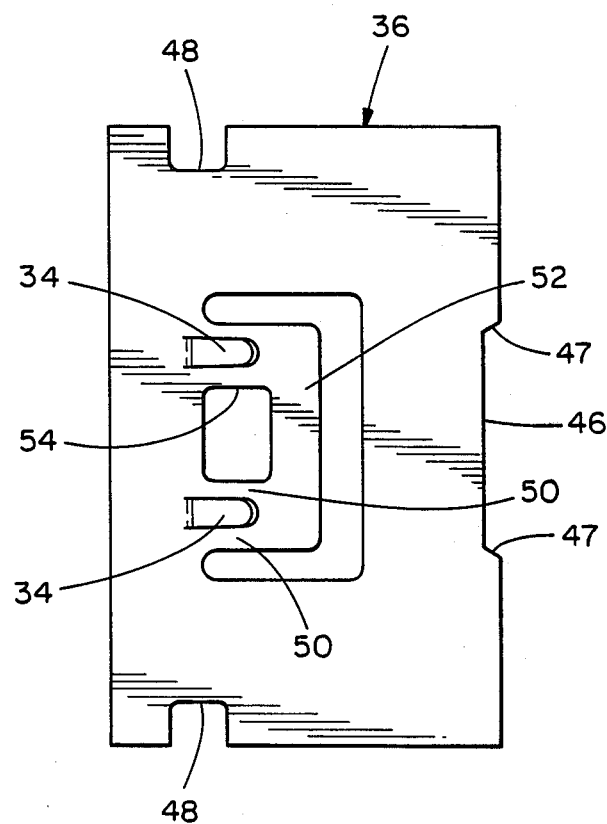
FIG. 3 is a plan view of a buckle blank before it is bent to form the buckle of FIG. 2.
Figure 4:
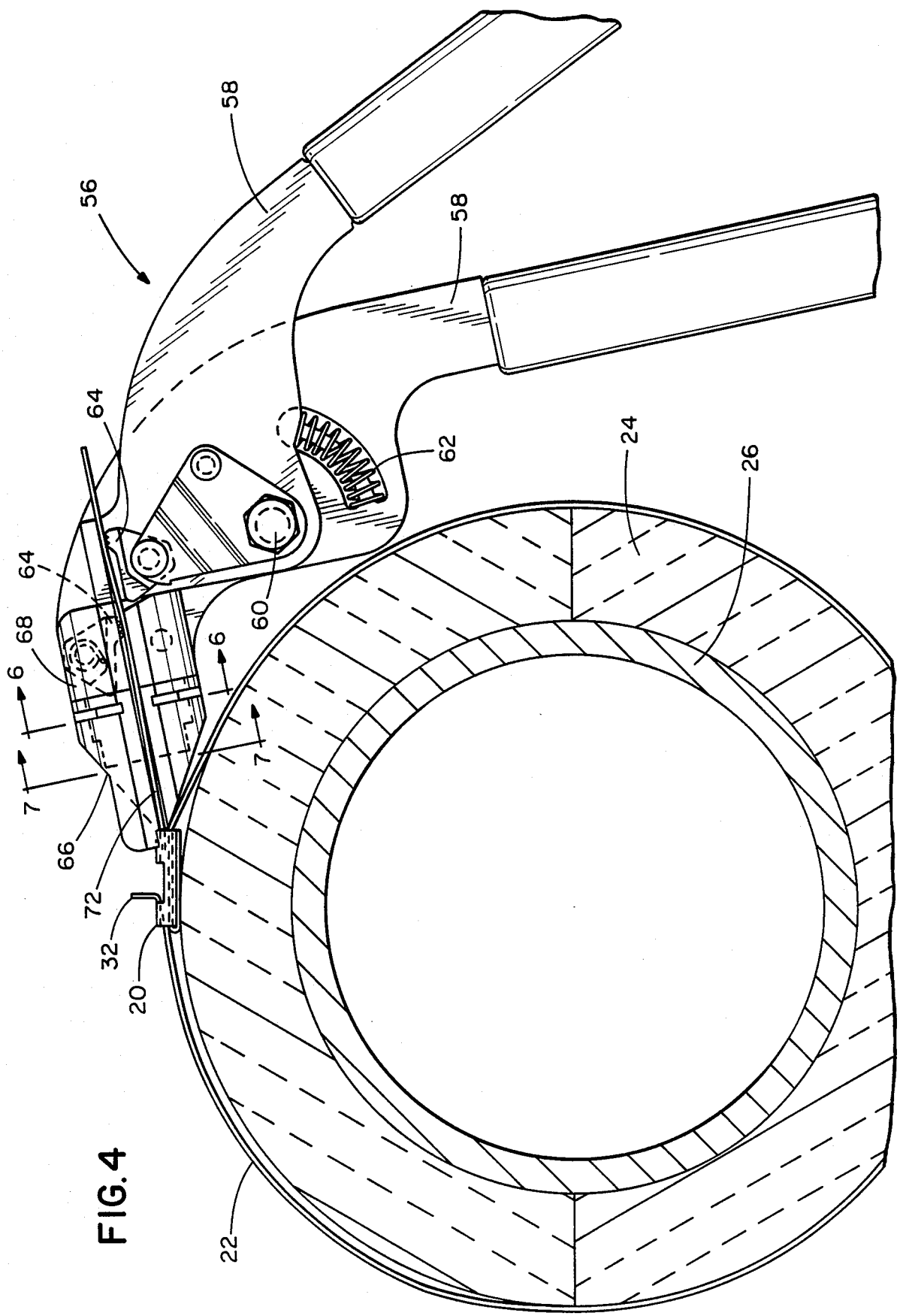
FIG. 4 is a side view of the buckle, strap, and insulation sheath of FIG. 1, showing an applicator tool initially positioned with the distal end of the strap inserted therein.

Preferably, buckle 20 is formed from stainless steel metal sheet stock which is shear formed to the configuration of planar blank 36, as seen in FIG. 3. Blank 36 is then folded relative to a medially located axis of symmetry to form tubular buckle 20, opposing edges of blank 36 abutting at seam 38. First and second bridge portions 28 and 30 are disposed substantially in the same plane. Retainer 32 extends upwardly from the inner edge of first bridge portion 28 toward said second bridge portion 30, retainer 32 substantially forming a right angle relative to first bridge portion 28. Retainer 32 is positioned parallel to and bends about an axis transverse to the longitudinal axis of retainer 32 forming a right angle with the longitudinal axis of buckle 20. Tabs 34 project inwardly, out of the plane of first and second bridge portions 28 and 30.

Opposing L-shaped portions 40 of buckle 20 extend the length of buckle 20; L-shaped portions 40 in conjunction with respective first and second bridge portions 28 and 30 respectively define first and second tubular portions 42 and 44.

Located on the outer edges of second bridge portion 30 is a strap receiving inset 46. Inset 46 is greater than one thickness of a strap deep and has an outer width of greater dimension than the width of strap 22 and an inner width of lesser dimension than the width of strap 22.

Inset 46 tapers from its greater outer width to its lesser inner width at inwardly converging angled edges 47. As strap 22 is folded around inset 46, the edges of strap 22 move inwardly on angled edges 47 to progressively smaller widths effecting a wedging and locking deformation of the lateral edges of strap 22. The locking action of inset 46 fixes strap 22 relative to buckle 20 preventing relaxation of tension initially induced in strap 22 and thus effecting retention of tension in strap 22 while the free end of strap 22 is secured beneath retainer 32.

For example, in one embodiment sized to fasten a standard one half inch strap, inset 46 has the following dimensions: an inner width of 0.475 inches (1.207 centimeters); an outer width of 0.510 inches (1.295 centimeters); and a depth of 0.030 inches (0.076 centimeters); where the strap has a width of 0.500 inches (1.270 centimeters) and a thickness of either 0.015 inches (0.038 centimeters) or 0.020inches (0.051 centimeters).

As seen in FIG. 3, cutouts 48 are positioned on seam 38 forming edges of buckle blank 36. Cutouts 48 form a square hole in the bottom surface of buckle 20 (not shown). The square hole in mating cooperating with a protuberance (not shown) in the first end of strap 22 can be utilized to fix the first end of strap 22 to buckle 20.

Retainer 32 includes four tines 50 which connect retainer 32 to first bridge portion 28; tines 50 being positioned in opposing pairs, with two tines 50 being positioned on opposite sides of each respective tab 34. An outer edge portion 52 of retainer 32 and tines 50 together form inwardly directed C-shaped retainer 32. The reduced area of retainer 32 at tines 50 facilitates the deformation of retainer 32. Retainer 32 and first bridge portion 28 together define tool engagement annulus 54. Tool engagement annulus 54 provides means for maintaining continuous contact with a retainer deformation tool.

Figure 8:
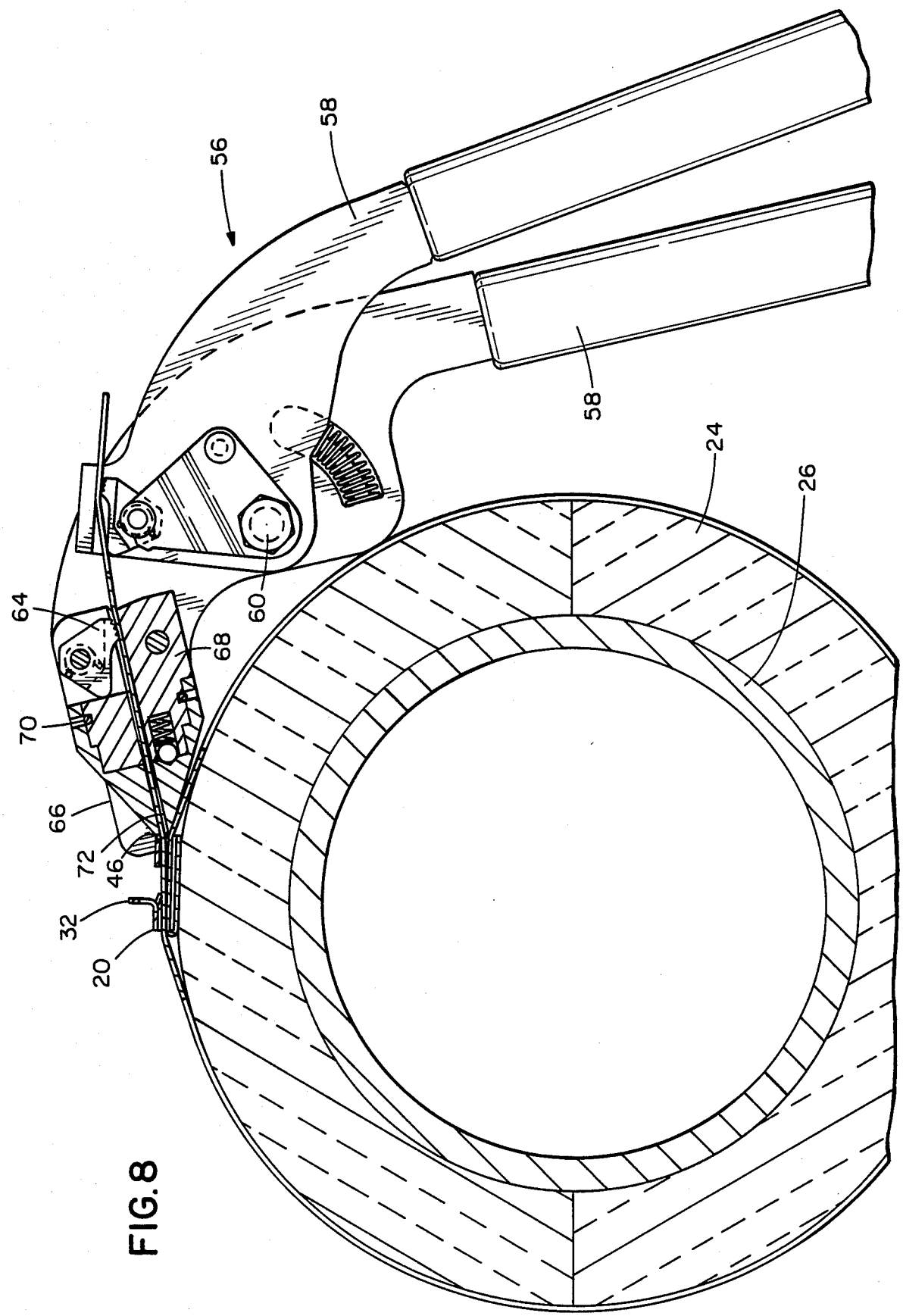
FIG. 8 is a side view similar to FIG. 4 with the applicator tool shown in partial section.
Figure 10:
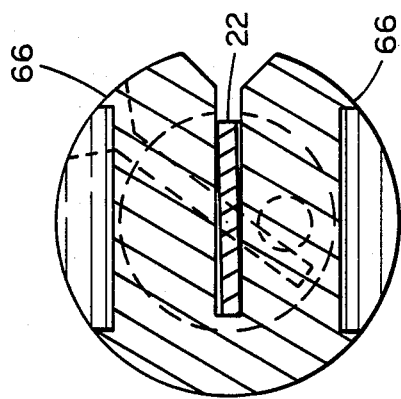
FIG. 10 is a sectional view taken along line 10-10 of FIG. 9.
Figure 9:
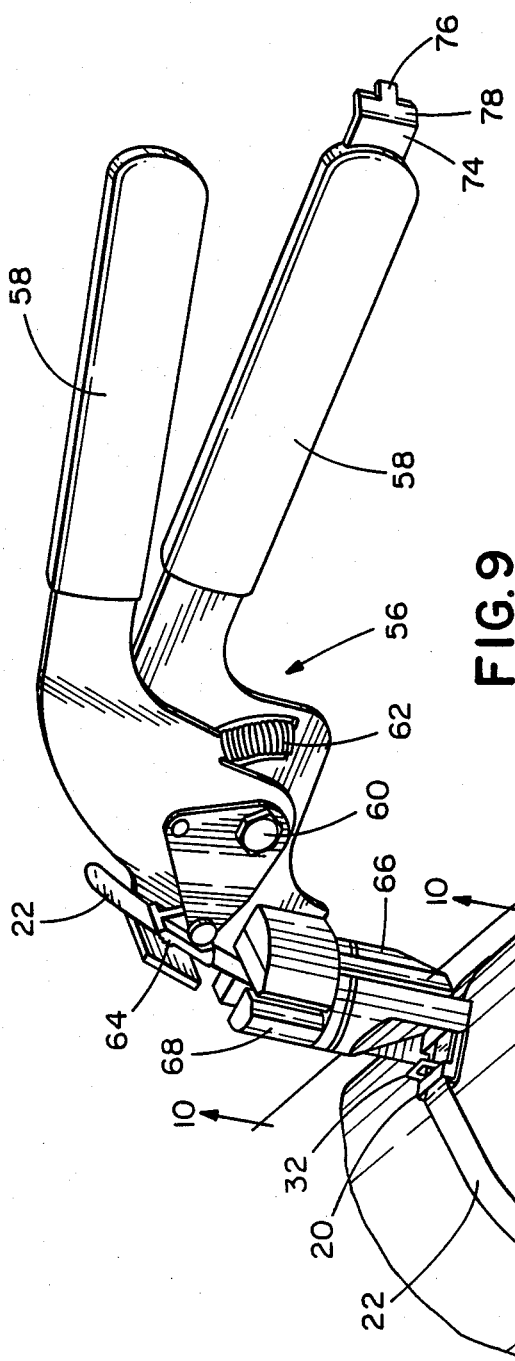
FIG. 9 is a perspective view showing the applicator tool of FIG. 4 rotated to a position to sever the strap.

As shown in FIGS. 4, 8, 9, 11 and 12, applicator tool 56 effects termination of buckle 20 and strap 22. Applicator tool 56 includes handles 58 pivotally connected by bolt 60 and biased apart by spring 62. Spring biased ratch pawls 64 effect tensioning of strap 22 upon convergence of handles 58. Cylindrical strap nose 66 is rotatably carried by a mounting cylinder 68, nose 66 being removably attached thereto by retaining ring 70. Nose 66 is designed to abut the end of buckle 20 and pivot towards buckle 20 approximately one hundred and thirty five degrees to fold the distal end of strap 22 upward. Nose 66 and mounting cylinder 68 together define an aligned strap slot 72. Strap slot 72 accepts and positions strap 22. As seen in FIGS. 9 and 10, rotation of applicator tool handles 58 and mounting cylinder 68 secured thereto, relative to stationary nose 66 effects severance of strap 22.

Figure 5:
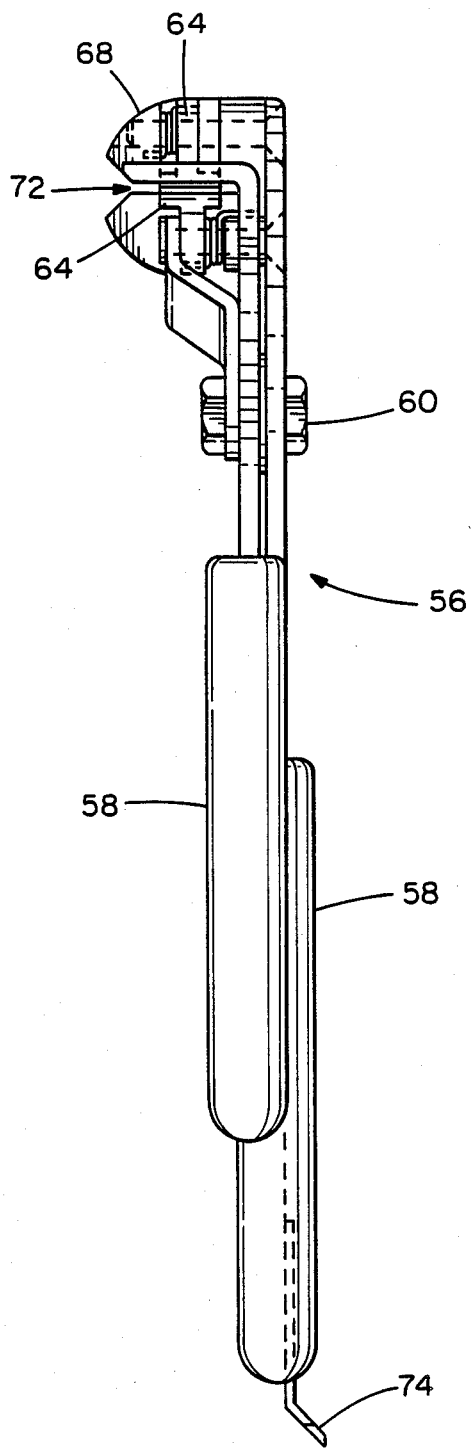
FIG. 5 is a front view of the applicator tool of FIG. 4.
Figure 6:
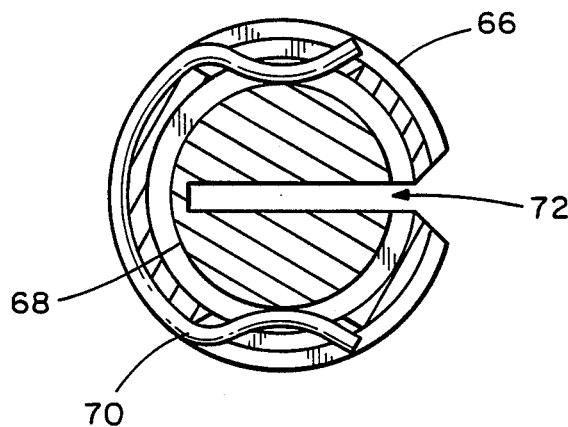
FIG. 6 is a sectional view taken along line 6-6 of FIG. 4.
Figure 7:
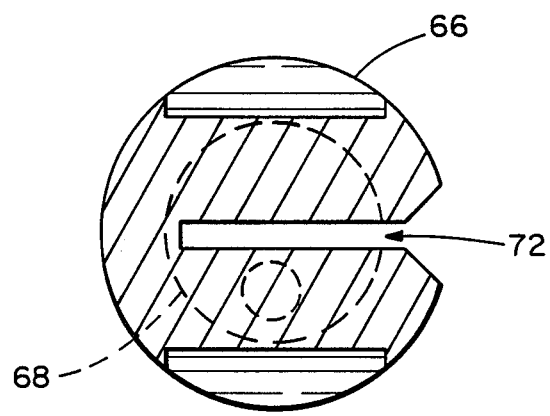
FIG. 7 is a sectional view taken along line 7-7 of FIG. 4.
Figure 12:
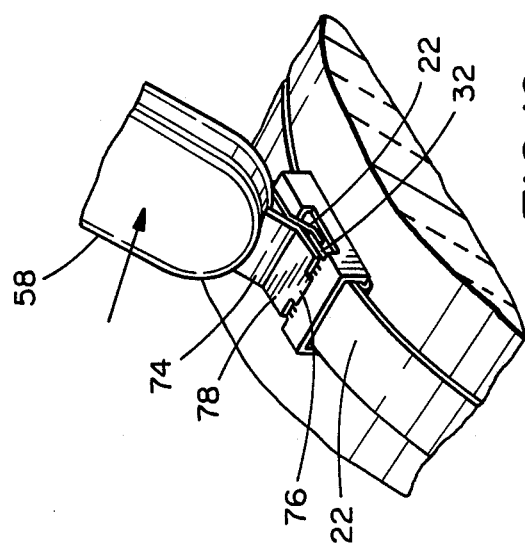
FIG. 12 is a perspective view of the retainer deformation tool after the retainer has been deformed to cover the distal end of the strap.
Figure 11:
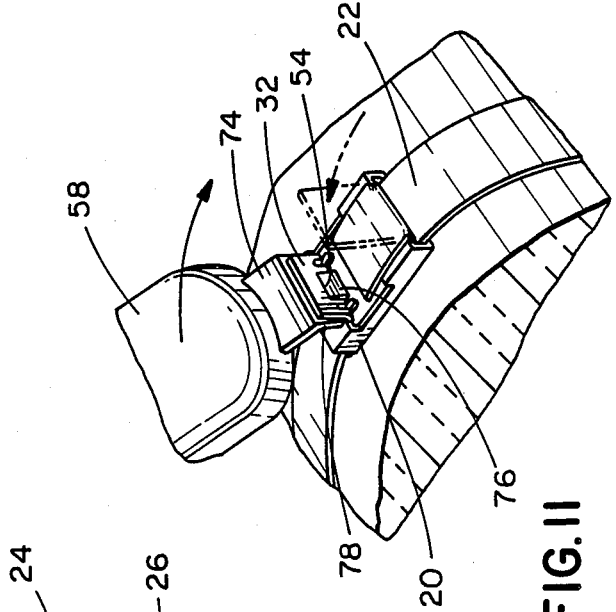
FIG. 11 is a perspective view of the initial placement of the retainer deformation tool relative to the buckle of FIG. 1.

Extending from the inner handle 58 is a retainer deformation tool 74, the T-shaped end of which includes a medially extending blade 76 and a rectangular retainer abutment portion 78. As seen in FIG. 5, the T-shaped end of retainer deformation tool 74 is bent at an angle of approximately forty-five degrees to the plane of handle 58. In use, blade 76 is inserted into tool engagement annulus 54 with retainer abutment portion 78 abutting the outer face of retainer 32. Rotation of retainer deformation tool 74 in the direction shown by the solid arrow of FIGS. 11 and 12 effects a controlled levered deformation of retainer 32 from its upwardly projecting position, as shown in FIG. 11, to a position which covers and captures the distal end of strap 22, as shown in FIG. 12.

Application of buckle 20 is as follows: buckle 20 is initially secured to strap 22 by inserting the buckle's inner wall between a fold in one end of strap 22, with the loose end of strap 22 exiting buckle 20 from the passageway of second tubular portion 44, as best seen in the sectional depiction of buckle 20 in FIG. 8. The first secured end of strap 22 is folded underneath buckle 20, with the later tensioning and termination of strap 22 securely pressing the first secured end of strap 22 between buckle 20 and the surface of the secured object.

The free or distal end of strap 22 is positioned around the object to be secured and passed first through the passageway of first tubular portion 42 and then through the passageway of second tubular portion 44. Tabs 34 direct strap 22 as it exits first tubular portion 42 into second tubular portion 44, facilitating insertion of strap 22 into buckle 20. The distal end of strap 22 projecting from second tubular portion 44 is inserted into applicator tool 56, which is then utilized to tension strap 22, fold strap 22 over second bridge portion 30 and sever strap 22 at a predetermined point short of second bridge portion 30, to allow the distal end of strap 22 to be folded beneath retainer 32.

After strap 22 is tensioned, bent upwardly, and severed, the severed end of strap 22 is manually positioned between first and second bridge portions 28 and 30 and beneath the height of first bridge portion 28. Blade 76 of retainer deformation tool 74 is then inserted into tool engagement annulus 54 with portion 78 abutting retainer 32, and while maintaining continuous contact with tool engagement annulus 54, retainer deformation tool 74 is rotated to effect controlled levered deformation of retainer 32 to a position covering and capturing strap 22, the distal end of strap 22 being deformed beneath the plane of second bridge portion 30, as seen in FIG. 12.

When terminated, retainer 32 securely holds strap 22 and prevents inadvertent contact with the sharp distal edge of strap 22.

What is claimed:

1. A buckle for fastening opposing ends of an object encircling strap, comprising: first and second bridge portions partially defining first and second tubular portions, and a deformable retainer extending from said buckle intermediate said first and second bridge portions, where said retainer is disposed in a generally upright first position extending above said first and second bridge portions an amount sufficient to allow a free end of said strap to be disposed adjacent thereto and where said retainer is deformable to a second position overlying said free end, said first and second tubular portions effecting fastening of a first end of said strap to said buckle and effecting fastening of said free end by consecutively accepting and locating said free end of said strap to secure said strap to said buckle such that a strap secured to said buckle at said first end can be manipulated to encircle an object and pass consecutively through said first tubular portion and said second tubular portion, and project from said second tubular portion, such that bending said free end over said second bridge portion, between said first and second bridge portions and into a position adjacent said retainer, and deforming said retainer into said second position overlying said free end to retard movement of said free end from between said first and second buckle portions effects fastening of said free end to said buckle, said retainer including engagement means for accepting a retainer deformation tool, said engagement means maintaining continuous contact with said tool during deformation of said retainer, wherein said retainer is C-shaped with the prongs of the C being attached to said first bridge portion, said retainer bending about an axis that forms a right angle with a longitudinal axis of said buckle, and wherein said engagement means includes a retainer tool engagement annulus defined by said C-shaped retainer and said first bridge portion.

2. A buckle as set forth in claim 1, including an inset disposed on the outer edge of said second bridge portion, said inset having a width smaller than the width of the strap, whereby said strap is laterally wedged within said inset as the strap is bent over said second bridge portion.

3. A buckle for fastening opposing ends of an object encircling strap, comprising: first and second bridge portions partially defining first and second tubular portions, and a deformable retainer extending from said buckle intermediate said first and second bridge portions, where said retainer is disposed in a generally upright first position extending above said first and second bridge portions an amount sufficient to allow a free end of said strap to be disposed adjacent thereto and where said retainer is deformable to a second position overlying said free end, said first and second tubular portions effecting fastening of a first end of said strap to said buckle and effecting fastening of said free end by consecutively accepting and locating said free end of said strap to secure said strap to said buckle such that a strap secured to said buckle at said first end can be manipulated to encircle an object and pass consecutively through said first tubular portion and said second tubular portion, and project from said second tubular portion, such that bending said free end over said second bridge portion, between said first and second bridge portions and into a position adjacent said retainer, and deforming said retainer into said second position overlying said free end to retard movement of said free end from between said first and second bridge portions effects fastening of said free end to said buckle, wherein said retainer is bendable about an axis that forms a right angle with a longitudinal axis of a strap secured within said buckle.

4. A buckle as set forth in claim 3, wherein said retainer extends from said first bridge portion toward said second bridge portion.

5. A buckle as set forth in claim 3, wherein said retainer is C-shaped with the prongs of the C being attached to an inner edge of said first bridge portion.

6. A buckle for fastening opposing ends of an object encircling strap, comprising: a first bridge portion spaced from a second bridge portion, said first and second bridge portions partially defining first and second tubular portions, and a deformable retainer attached to said first bridge portion by a hinge section disposed to effect rotation of said retainer about an axis substantially perpendicular to a longitudinal axis of a strap secured within said buckle, where said retainer is disposed in a generally upright first position extending above said first and second bridge portions an amount sufficient to allow a free end of said strap to be disposed adjacent thereto and where said retainer is deformable to a second position overlying said free end, said first and second tubular portions effecting fastening of a first end of said strap to said buckle and consecutively accepting and locating said free end of said strap to secure said strap to said buckle such that a strap secured to said buckle at said first end can be manipulated to encircle an object and pass consecutively through said first tubular portion and said second tubular portion, and project from said second tubular portion, bending said free end over said second bridge portion, between said first and second bridge portions and into a position adjacent said retainer, and deforming said retainer into said second position overlying said free end to retard movement of said free end from between said first and second bridge portions effecting fastening of said free end to said buckle.

7. A buckle as set forth in claim 15, wherein said retainer is C-shaped having a plurality of prongs, the prongs of the C-shaped retainer being integrally attached to said first bridge portion to define said hinge section at the junction therebetween,
said first bridge portion and said C-shaped retainer defining an engagement annulus that accepts a retainer deformation tool.

8. A buckle as set forth in claim 1, including an inset disposed on an outer edge of said second bridge portion, said inset having a width smaller than the width of the strap, whereby said strap is laterally wedged within said inset as the strap is bent over said second bridge portion.

* * * * *

UNITED STATES PATENT AND TRADEMARK OFFICE
CERTIFICATE OF CORRECTION

PATENT NO. : 4,866,817
DATED : September 19, 1989
INVENTOR(S) : Espevik et al.

It is certified that error appears in the above-identified patent and that said Letters Patent is hereby corrected as shown below:

Claim 1, column 5, line 34, change "buckle" to --bridge--.

Claim 5, column 6, line 20, change "with" to --having a plurality of prongs,--.

Claim 7, column 6, line 52, change "15" to --6--.

Claim 8, column 6, line 60, change "1" to --7--.

Signed and Sealed this

Twelfth Day of March, 1991

*Attest:*

HARRY F. MANBECK, JR.

*Attesting Officer*  *Commissioner of Patents and Trademarks*